(12) United States Patent
Graf et al.

(10) Patent No.: US 6,684,143 B2
(45) Date of Patent: Jan. 27, 2004

(54) METHOD FOR CONTROLLING AN AUTOMATIC TRANSMISSION AND CONTROLLER SUITABLE FOR SUCH A METHOD

(75) Inventors: Friedrich Graf, Sinzing (DE); Tibor Kiss, Regensburg (DE); Martin Lachmayr, Regensburg (DE); Bernd Last, Donaustauf (DE); Stefan Lauer, Pettendorf-Kneiting (DE); Martin Manz, Regensburg (DE); Stephan Pindl, Bad Abbach (DE); Tanja Roy, Holzheim am Forst (DE)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 10/115,839

(22) Filed: Apr. 3, 2002

(65) Prior Publication Data
US 2002/0142885 A1 Oct. 3, 2002

(30) Foreign Application Priority Data
Apr. 3, 2001 (DE) .......................... 101 16 545

(51) Int. Cl.[7] .............................................. G06F 17/00
(52) U.S. Cl. .................................... 701/51; 180/337
(58) Field of Search ............................ 701/51, 53, 64; 180/170, 337, 338

(56) References Cited

U.S. PATENT DOCUMENTS

| 4,648,040 A | * | 3/1987 | Cornell et al. ............... 701/52 |
| 4,663,713 A | * | 5/1987 | Cornell et al. ............... 701/52 |
| 5,396,420 A | * | 3/1995 | Graf ............................ 701/55 |

FOREIGN PATENT DOCUMENTS

EP 633155 A2 * 1/1995 ........... B60K/41/06

* cited by examiner

Primary Examiner—William A. Cuchlinski, Jr.
Assistant Examiner—Olga Hernandez
(74) Attorney, Agent, or Firm—Laurence A. Greenberg; Werner H. Stemer; Gregory L. Mayback

(57) ABSTRACT

A method for controlling an automatic transmission in a drive train of a motor vehicle having a transmission controller selecting and shifting gears of the transmission includes determining a new gear by reference to gear shift characteristic curves and generating a gear shift instruction as soon as a working point of the drive train exceeds a gear shift characteristic curve. The transmission controller determines a new gear that is expected to be engaged shortly. If the new gear differs from the current gear, an initial phase of the gear shift is carried out and the gear shift is completed as soon as the gear shift instruction has been generated. The initial phase is carried out as soon as the working point drops below a predefined distance from the gear shift characteristic curve.

12 Claims, 6 Drawing Sheets

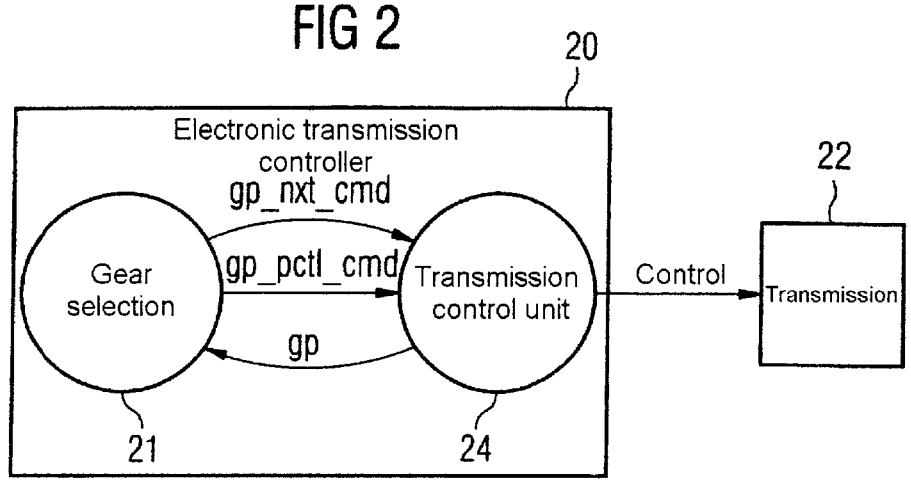
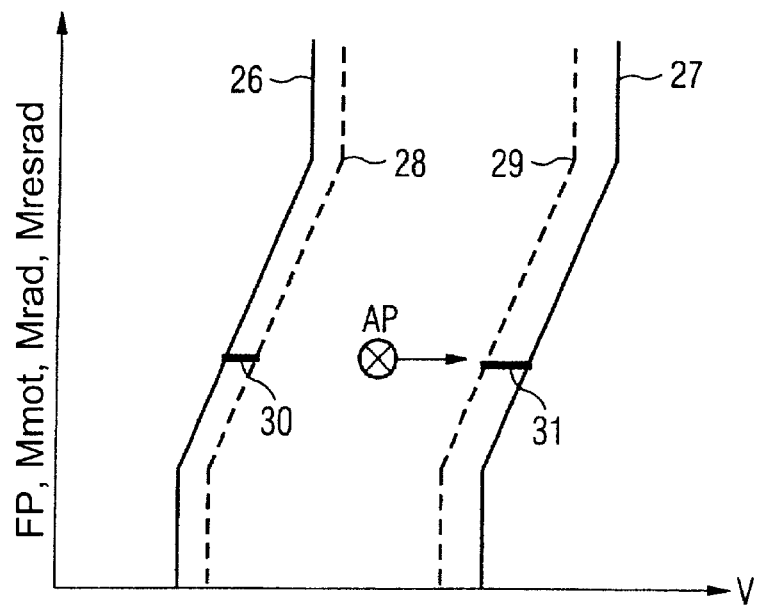

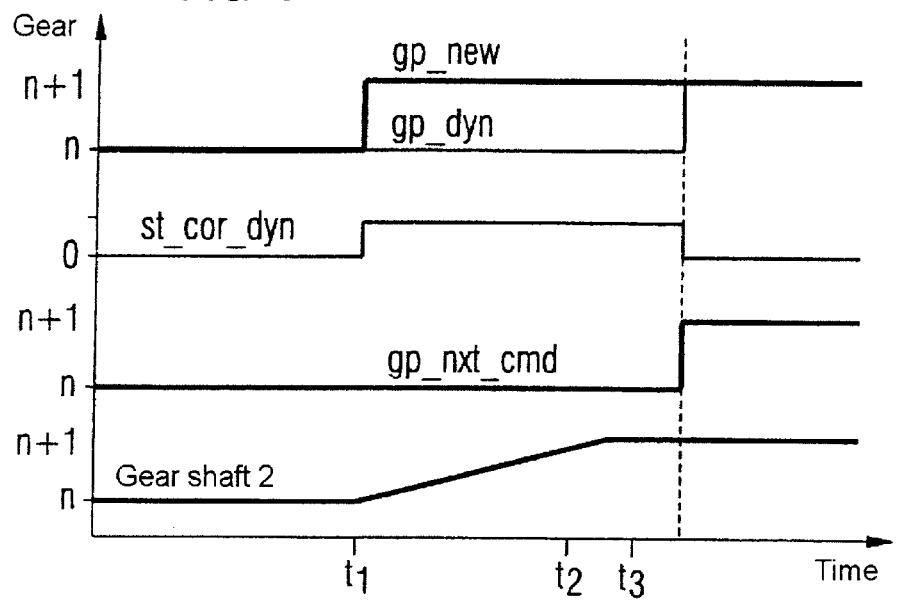
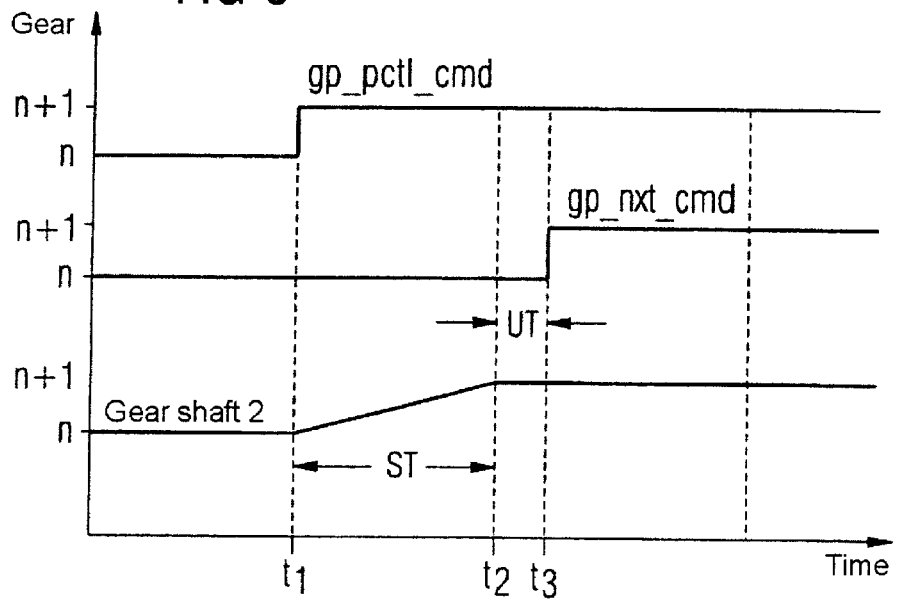

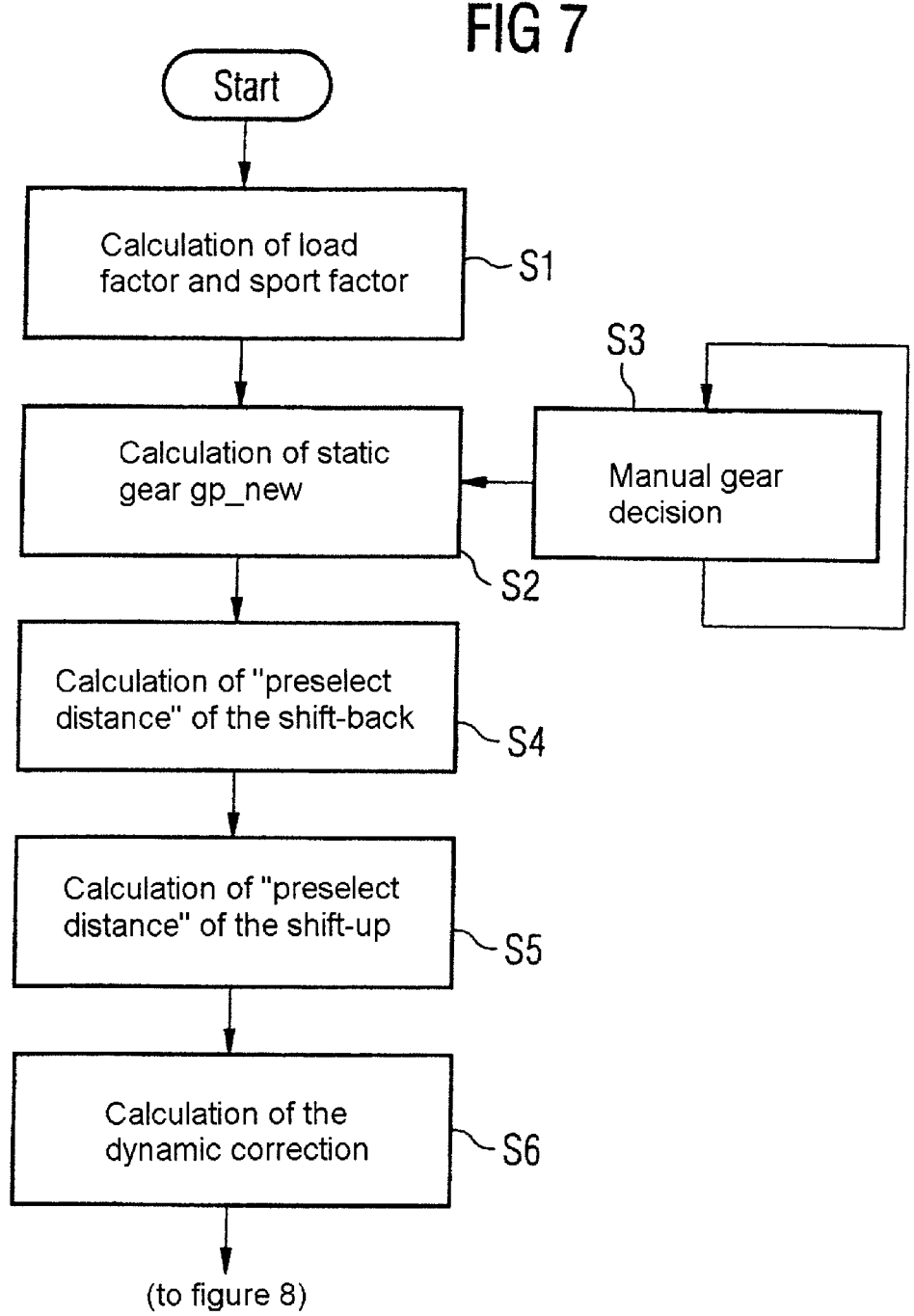

METHOD FOR CONTROLLING AN AUTOMATIC TRANSMISSION AND CONTROLLER SUITABLE FOR SUCH A METHOD

BACKGROUND OF THE INVENTION

Field of the Invention

The invention relates to a method for controlling an automatic transmission in a drive train of a motor vehicle and a controller for the automatic transmission of a motor vehicle. The method is used to control an automatic transmission in a drive train of a motor vehicle whose transmission controller carries out a gear selection and a gear shift. A new gear is determined during the gear selection by reference to a characteristic diagram and a new gear that is expected to be engaged shortly is determined by its transmission controller, an initial phase of the gear shift being carried out when the new gear differs from the currently engaged gear, and a gear shift being completed as soon as the gear shift instruction has been generated.

German Patent DE 199 37 716 C1 discloses a method for controlling an automatic transmission in a drive train of a motor vehicle. The publication does not specify when or by which event the initial phase of the gear shift is triggered.

German Published, Non-Prosecuted Patent Application DE 198 19 463 A1 discloses a method for controlling an automatic transmission in a drive train of a motor vehicle whose transmission controller carries out a gear selection and a gear shift. A new gear is determined during the gear selection by reference to gear shift characteristic curves stored in a characteristic diagram, and a gear shift instruction, by which a gear shift is triggered, is generated as soon as a working point of the drive train exceeds a gear shift characteristic curve. If it is possible to shorten the gear shift time required for a gear shifting operation, on one hand, the gear shift comfort for the driver is increased and, on the other hand, it is possible to improve the sporty characteristics of the motor vehicle.

German Published, Non-Prosecuted Patent Application DE 195 33 305 A1 (D2) discloses an automatic transmission based on the object of enabling the driver to make interactive intervention by which the information regarding the transmission behavior that the driver is currently dissatisfied with is transmitted to the control unit of the transmission. The gear shift tendency or the dynamic behavior of an operating point referred to the gear shift characteristic curves of a characteristic diagram are used to carry out a premature gear shift. The gear shift is not carried out shortly but is, instead, brought forward, at the driver's request.

German Published, Non-Prosecuted Patent Application DE 196 26 193 A1 (D3) discloses a device for controlling programmed automatic variable transmissions for motor vehicles. The control device is composed of an electronic programmed circuit and a multiplicity of sensors that are connected thereto and that supply the circuit with a multiplicity of signals that influence the selection of the driving positions of the automatic transmission. The signals originate from the chassis and from the engine, and additional signals are generated manually by the driver. Further signals that cannot be influenced by the driver sense the physical conditions of the driver. Examples of such conditions are the transpiration rate, the posture in the seat, and the pulse rate, and they are, therefore, physical functions that can change in a stressful or hazardous situation.

SUMMARY OF THE INVENTION

It is accordingly an object of the invention to provide a method for controlling an automatic transmission and controller suitable for such a method that overcomes the hereinafore-mentioned disadvantages of the heretofore-known devices and methods of this general type and that shorten the gear shift time required for a gear shifting operation.

With the foregoing and other objects in view, there is provided, in accordance with the invention, a method for controlling an automatic transmission in a drive train of a motor vehicle having a transmission controller selecting and shifting gears of the transmission, including the steps of determining a new gear during a gear selection by referring to a gear shift characteristic curve stored in a characteristic diagram, generating a gear shift instruction to trigger a gear shift as soon as a working point of the drive train exceeds a corresponding point on the gear shift characteristic curve, determining, with the transmission controller, a new gear expected to be engaged shortly and carrying out an initial phase of the gear shift when the new gear differs from the currently engaged gear and as soon as the working point exceeds a pre-defined distance from the gear shift characteristic curve, and completing a gear shift as soon as the gear shift instruction has been generated.

The transmission controller determines the new gear and carries out the initial phase of the gear shifting operation as soon as the working point drops below a predefined distance from a gear shift characteristic curve stored in the characteristic diagram, and the gear shift instruction to trigger the gear shift is generated as soon as the working point of the drive train exceeds the corresponding gear shift characteristic curve.

The advantages of the invention are, inter alia, the fact that the initial phase of the gear shifting operation remains completely unnoticed by the driver. If a predetermined gear that has been determined by the transmission controller as a gear that is expected to be engaged shortly is then not engaged for whatever reason, the lack of engagement does not adversely affect the gear shift comfort in any way.

In accordance with another mode of the invention, pre-selection characteristic curves running at the pre-defined distance from the individual gear shift characteristic curves are stored in the characteristic diagram.

In accordance with a further mode of the invention, a distance between the preselection characteristic curves and the gear shift characteristic curves is calculated as a function of a transmission type.

In accordance with an added mode of the invention, a distance between the preselection characteristic curves and the gear shift characteristic curves is calculated as a function of a transmission type during ongoing operation.

In accordance with an additional mode of the invention, a gear shift to a gear determined as being expected to be engaged shortly is prohibited if a dynamic correction of the gear shift instruction has taken place.

In accordance with yet another mode of the invention, the prohibited gear shift is carried out as soon as the dynamic correction of the gear shift instruction is eliminated.

In accordance with yet a further mode of the invention, the suppressed new gear is set as being the new gear to be engaged shortly.

In accordance with yet an added mode of the invention, an expected gear shift instruction is predicted by analyzing, in a manual driving mode, a behavior of a driver of the motor vehicle characteristic of a driving style.

With the objects of the invention in view, there is also provided a method for controlling an automatic transmission in a drive train of a motor vehicle having a transmission controller selecting and shifting gears of the transmission, including the steps of determining a new gear during a gear selection by referring to a gear shift characteristic curve stored in a characteristic diagram, generating a gear shift instruction to trigger a gear shift as soon as a working point of the drive train exceeds a corresponding point on the gear shift characteristic curve, determining, with the transmission controller, a new gear expected to be engaged shortly and carrying out an initial phase of the gear shift as soon as the working point exceeds a pre-defined distance from the gear shift characteristic curve, and completing a gear shift as soon as the gear shift instruction has been generated.

With the objects of the invention in view, in an automatic transmission of a motor vehicle, the transmission having gears, there is also provided a transmission controller for controlling a transmission ratio, including a characteristic diagram memory storing transmission ratios to be set as a function of a torque and a variable functionally associated with a speed of the vehicle, gear shift characteristic curves, and preselection characteristic curves lying at a predetermined distance from said gear shift characteristic curves, and a processor programmed to signal an expected new gear to the transmission and to prepare a gear shifting operation when a working point overshoots said preselection characteristic curves and to trigger a gear shifting operation when the working point of the motor vehicle overshoots the gear shift characteristic curves.

In accordance with a concomitant feature of the invention, there are provided a gear selector circuit for determining a new gear of the transmission, said gear selector circuit connected to said processor, and a transmission control unit connected to said processor and to said gear selector circuit, said transmission control unit receiving a new gear signal, preparing a gear shifting operation, and carrying out a gear shift to the new gear as soon as the new gear determined by said gear selector circuit differs from a currently engaged gear.

Other features that are considered as characteristic for the invention are set forth in the appended claims.

Although the invention is illustrated and described herein as embodied in a method for controlling an automatic transmission and controller suitable for such a method, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 2 is a block circuit diagram of signals exchanged between the transmission controller and the transmission in the method according to the invention;

FIG. 3 is a graph indicating a gear shift characteristic diagram used in the method according to the invention;

FIG. 4 is a graph of a time profile of a plurality of instruction signals in the method according to the invention;

FIG. 6 is a graph of a time profile of a plurality of instruction signals in another example of a method according to the invention; and FIGS. 7 and 8 are flow charts of a program executed in the method according to the invention.

DESCRIPTION OF THE PREFERRED EMBODIMENTS

Figure 1:
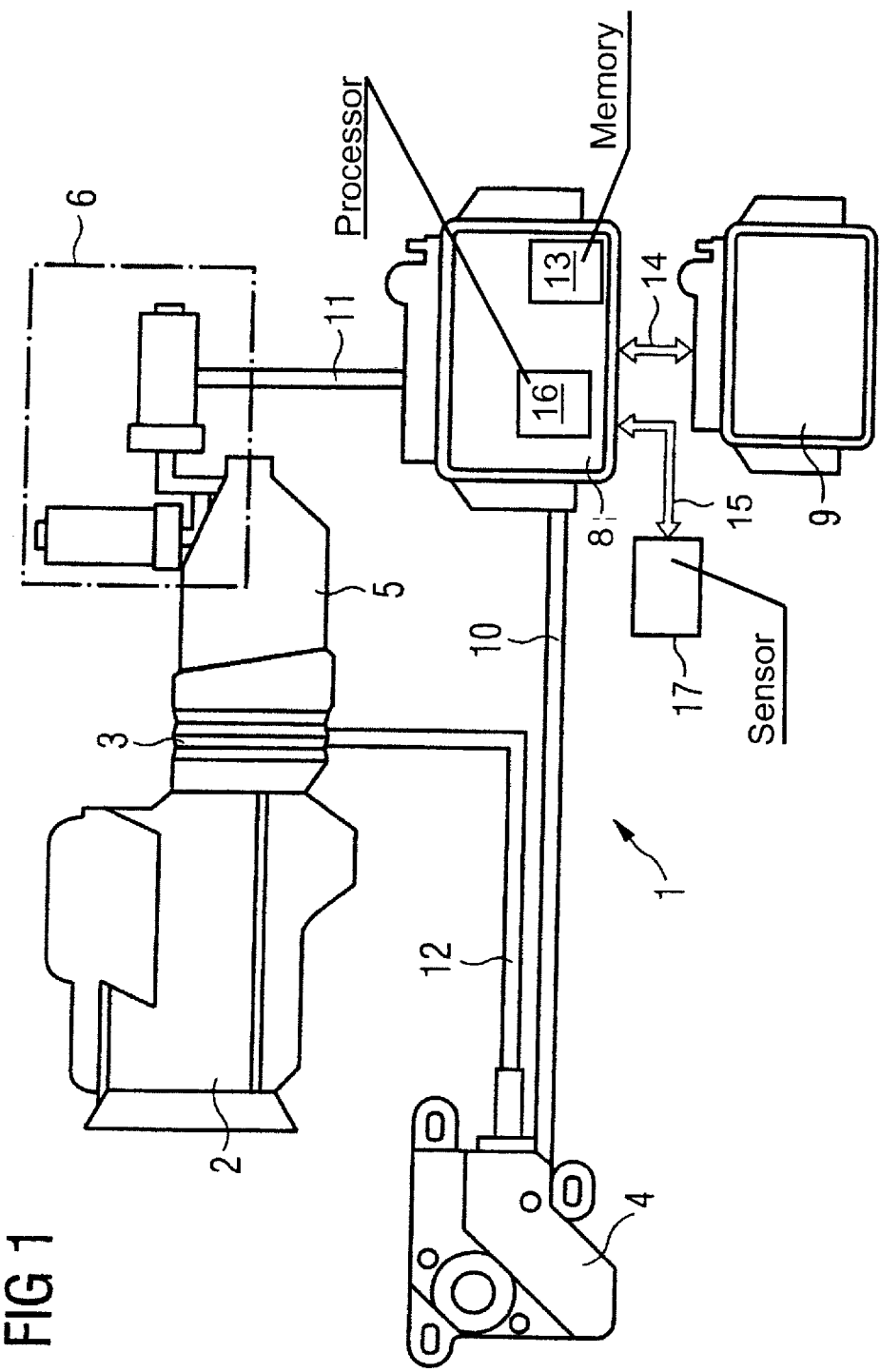
FIG. 1 is a diagrammatical illustration of a motor vehicle drive train with a controller for an automated manual shift transmission according to the invention.

Referring now to the figures of the drawings in detail and first, particularly to FIG. 1 thereof, there is shown a motor vehicle drive 1 having—insofar as it is significant for the present invention—the following components: an engine 2, a clutch 3, a clutch actuator (also referred to below as actuator element or actuator drive for the clutch) 4, an automatic transmission 5, a transmission actuator 6, an electronic transmission controller 8 for the actuator element 4 and the transmission actuator 6, and an engine controller 9. The transmission controller 8 is connected to the actuator element 4 by control and signal lines 10 and to the transmission actuator 6 by control and signal lines 11.

The actuating element 4 can be embodied as an electromotively driven actuator or as a hydraulically driven actuator. In the exemplary embodiment described herein, a hydraulic actuator element 4 is used that is connected to the clutch 3 by a force transmitting configuration 12 that is embodied for example as a pressure line. The transmission controller 8 contains, inter alia, a processor 16 connected to a characteristic diagram store or memory 13 on which details will he given below. It is connected by a multiple data line or a data bus 14 to the engine controller 9 and by data lines or a databus 15 to a plurality of sensors that are disposed in the motor vehicle in a conventional fashion at various points (engine, transmission, brakes etc.) and are indicated by a block 17.

In the present exemplary embodiment, the transmission 5 is embodied in the motor vehicle drive 1 as an automatic transmission. However, it may also be embodied as an automated manual shift transmission (ASG) that corresponds structurally to a conventional manual shift transmission in which, however, the gears are shifted automatically, and the clutch is activated automatically.

A gear shifting operation in an automatic transmission is generally triggered and controlled by an electronic transmission controller that is illustrated in FIG. 2 as a block 20. This operation can be structurally divided into the selection of the suitable gear, which is carried out in a gear selector (unit) 21, and into the control of the transmission 22, in particular, during a gear shift, which is carried out in a transmission control unit 24.

A gear shift is implemented, for example, by a new, subsequent gear gp_nxt_cmd being determined by the gear selector 21. If the gear differs from the currently engaged gear gp, the difference is interpreted by the transmission control unit 24 as a gear shift instruction and a shift to the next gear is carried out in the transmission 22. The gear shifting operation is triggered in that either a gear shift characteristic curve is exceeded in an automatic driving mode or a corresponding instruction is given by the driver in a manual driving mode by a switch or selector lever.

The gear shift is divided into various phases whose configuration depends, in particular, on the respective embodiment of the automatic transmission. In an initial phase, actions for preparing the gear shift operation are already carried out in the transmission but the transmission ratio and the torque at the wheels remain unchanged. The initial phase is unnoticed by the driver. After the initial phase, the actual shifting begins, that is to say, the gear shift operation during which the transmission ratio and the torque at the wheels is changed.

The central feature here is to determine, before the actual gear shift command, that is to say, a change in the instruction gp_nxt_cmd, that gear gp_pct1_cmd which is expected to be engaged in the near future. If the predetermined gear differs from the currently engaged gear gp, the initial phase of a gear shifting operation is immediately begun. The gear shifting operation that is begun is then continued and completed, if the actual gear shift command, that is to say, the instruction gp_nxt_cmd, occurs.

As a result of the division into two gear shift phases and the preparation of the next gear, the required gear shift time can be considerably shortened, and the comfort of the driver or the sportiness of the vehicle can, thus, be increased. If the predetermined gear does not correspond to the actual gear shift command, the initial phase that is already initiated—without being noticed by the driver—is aborted and the actually required gear shift is carried out as soon as it becomes current.

The actual gear shift instructions are advantageously generated by an intelligent adaptive transmission controller developed by the assignee of the instant application (see, for example, German Published, Non-Prosecuted Patent Application DE 196 37 210 A1, corresponding to U.S. Pat. No. 6,188,945 to Graf et al., which is hereby incorporated by reference) that has also become recognized under the name SAT transmission controller. The present transmission controller and the associated control method can be integrated very well into the gear shift and program structure of a SAT transmission controller.

The two-phase control method according to the invention with predetermination of the new gear is also referred to below for short as "gear preselection". A distinction is made here between a gear preselection in the automatic mode, a gear preselection in the automatic mode with dynamic correction, and a gear preselection in the manual mode, that is to say, when there is a desired gear input by the driver.

The gear preselection in the automatic driving mode is explained by a (gear shift) characteristic diagram that is shown in FIG. 3 and in which the working point AP of the motor vehicle drive—characterized by the current accelerator position FP, the engine torque Mmot, the wheel torque Mrad, or the remaining wheel torque Mresrad—is represented as a function of the speed v of the vehicle or a variable that is proportional thereto. For the sake of better clarity, only two characteristic diagrams: a shift-down characteristic curve 26 and a shift-up characteristic curve 27 are shown in the characteristic diagram. If the working point AP exceeds the shift-up characteristic curve 27, a shift-up is triggered in a conventional fashion; if it drops below the shift-down characteristic curve a shift-down operation is triggered.

The characteristic diagram also contains here what are referred to as preselection characteristic curves that run at a predefined distance from the respective characteristic curve and of which only two are illustrated (shown by broken lines) for the sake of explanation: a preselection shift-down characteristic curve 28 and a preselection shift-up characteristic curve 29.

The preselection function of the transmission controller then lies in the fact that even before the working point AP exceeds a shift-up or shift-down characteristic curve, the next gear is signaled and the transmission is prepared for the imminent gear shift operation.

Distances 30 and 31 of the working point AP from the characteristic curve 26 or 27 are decisive for the prediction of the next gear. If one of these distances exceeds a critical dimension, which is referred to as the preselected distance 30 or 31, a preselection of the next or new gear is made. The preselection characteristic curves 28 and 29 run at the distance 30 and 31 from the respective characteristic curve 26 or 27. The distances 30 and 31 depend on the driving speed and on the vehicle type. They are predefined for each point of the associated gear shift characteristic diagram. In an exemplary embodiment, the distance at an average driving speed corresponds to a speed change of $\Delta v = 5$ km/h.

If the distance 31 between the working point AP and the shift-up characteristic curve 27 is undershot, the transmission is prepared for an imminent shift-up operation, and when the distance 30 from the shift-down characteristic curve 26 is undershot a shift-down operation is prepared. To ensure reliable operation and to adapt the prediction to the various types of transmission (double clutch transmission, planetary gear transmission, automated manual shift transmission), the distance is continuously calculated in real-time operation.

The gear preselector in the automatic driving mode with dynamic correction will now be explained with reference to instruction signal profiles shown in FIG. 4.

In the aforementioned SAT transmission controller, a gear change from a current gear n to a new gear n+1, which was supposed to be statically triggered when the signal gp_new exceeded a gear shift characteristic curve at a time $t_1$, is prohibited for a certain time under particular driving conditions. Such a configuration constitutes a dynamic correction that is brought about by an occurrence of a signal st_cor_dyn. As a result, the dynamically corrected gear gp_dyn=n is engaged. The gear shift to the gear n+1 does not take place until this signal is eliminated again at a time $t_3$, that is to say, assumes the status "0" again. A gear that is conventionally calculated by the transmission controller 8, in particular, by a SAT transmission controller, that is to say, without using the method according to the invention, is referred herein as "static".

In such a case, the suppressed new gear is used directly as a gear preselection. In the corresponding initial phase between the times $t_1$ and $t_2$, a second shaft in the transmission is synchronized, that is to say, the engine is accelerated from the rotational speed corresponding to the gear n to the rotational speed of n+1. After the dynamic correction is eliminated, the suppressed gear is passed on and the gear shift command gp_nxt_cmd becomes effective.

Figure 5:
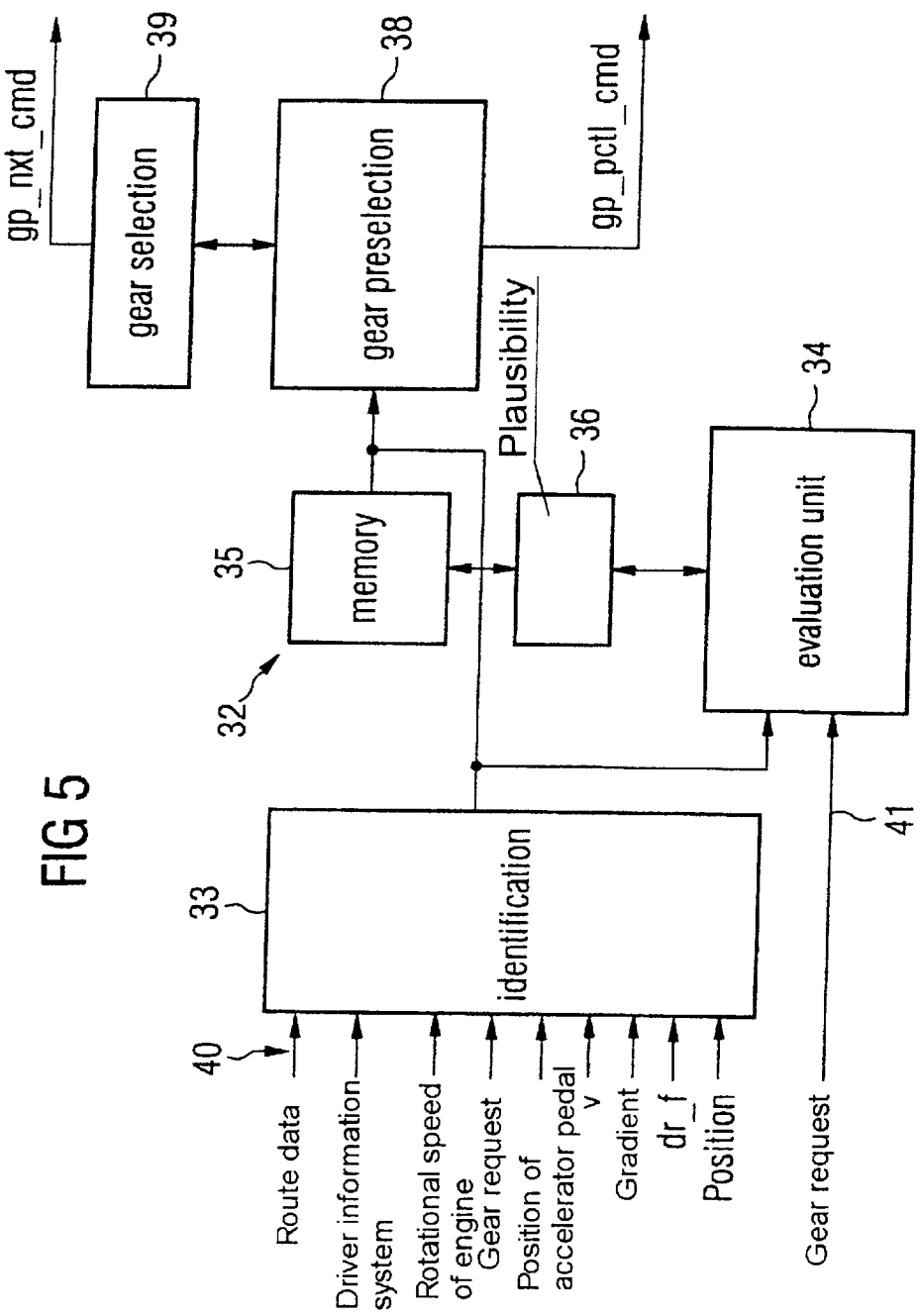
FIG. 5 is a block circuit diagram of a gear shift control unit of a transmission controller according to the invention.

The gear preselection in the manual driving mode will now be explained with reference to a gear shift control unit 32 shown in FIG. 5. The unit 32 includes an evaluation logic 33, a computing and logic element 34 or arithmetic unit, a memory 35, a plausibility circuit 36, a gear selector circuit 38, and a gear preselector circuit 39 that are connected to one another by the data and signal lines shown in the drawing. The normal new gear is calculated—as defined in the SAT transmission controller—and output as a gear shift instruction gp_nxt_cmd in the gear selector circuit 38. The gear shift instruction gp_nxt_cmd is referred to here, as mentioned above, as a steady-state gear shift instruction.

During the gear preselection in the manual mode, it is more difficult to predict a gear shift instruction to be expected from the driver. One possibility is to analyze the typical behavior of the driver to be able to make an appropriate prediction in similar situations. Another possibility is to evaluate information that is supplied by sensors in or on the vehicle and that enables a gear shift request to be detected.

For such a purpose, all the gear shift operations triggered by the driver and the associated driving conditions are analyzed by an evaluation logic 33 and a driver characterization that is derived therefrom is stored in a memory 35. The evaluation logic 33 continuously monitors the gear shift behavior of the driver and stores all the data necessary for analysis before and after the actual driver intervention: data relating to the route, from a driver information system, relating to the rotational speed of the engine, the gear request, the accelerator pedal position, the speed of the vehicle, the inclination of the carriageway, the driving style (is determined by a fuzzy logic system during SAT transmission control), and the position of the gear shift selector lever.

The data is fed to the evaluation logic 33 through signal inputs 40. It is supplied partly by the sensors 17 and partly by the transmission controller 8. A gear request that is input through a gear shift lever, a selector lever, a gear shift rocker, or the like is fed through an input line 41 to the arithmetic unit 34. Here, for example, the following aspects are examined:

how frequently was each gear engaged (manually or automatically)?

For how long was each gear held on average?

At what rotational speeds and at what speed of the vehicle was the corresponding gear engaged?

What additional operational variables (activation of the brakes, gradient of the accelerator pedal, load value or driver value etc.) are characteristic of the driving style?

How frequently was the prediction of the next gear correct or incorrect?

The cause of the gear shift operation can be determined from the pre-history before a gear shift operation and the observation of the situation after the gear shifting. The logic linking of the data is carried out in the computing and logic unit 34. If all the gear shift operations that have been carried out have been classified according to the observed situations, an empirical driven profile can be stored in the memory 35.

From the driver profile stored in the memory 35 and the data in the evaluational logic unit 33, it is possible to draw conclusions about the new gear that the driver is expected to engage. The calculation is carried out in the gear preselector circuit block or module 39 and a corresponding instruction gp_pct1_cmd signaling what is expected to be the next gear is output.

Gear shifting interventions of the driver that cannot be associated with any conventional driving situation are filtered out by the plausibility circuit 36 and not included in the storage process. The driver profile that is determined can be stored in a personal memory for each individual driver and it can be used as an initial data record after the vehicle is started again.

In addition, the evaluation of sensor signals and information from other electronic systems, in particular, from navigation systems, provides the possibility of predicting gear shift requests of the driver or supporting the information acquired from the driver characteristic described above. Examples of such possibilities are:

The movement of the driver's hand to the gear shift lever or other operating controls for shifting gear can already be detected at an early time by movement or proximity sensors. Weight sensors in the driver's seat can also give an indication of a movement toward the gear shift lever.

The signal of a gear shift lever is usually initially debounced, that is to say, read out repeatedly before it is interpreted by the electronic transmission controller as an ensured gear shift instruction. However, even the first occurrence of the signal can be used to predict a new expected gear.

Color and distance sensors provide information on the current traffic situation by the possibility of detecting brake lights or states of traffic lights. With knowledge of the traffic situation, it is possible to predict probable shift-up and shift-down operations.

Information relating to the traffic situation and terrain can be obtained through GPS navigation systems. Shift-up and shift-down operations that were expected to become necessary can also be predictably determined therefrom.

It is decisive to determine the predicted future gear even before an actual gear shift command to the automatic transmission 5 is triggered so that it is possible to begin the initial phase of a gear shift immediately and, as a result, the gear shift time can be significantly shortened.

To achieve the response time improvement, in the automatic driving mode, the distance between the current working point and a gear shift characteristic curve is determined and used to predetermine the future gear and to determine the most suitable time for it to be output. When a dynamic correction is present, the predetermined gear can be transferred to directly from it.

In the manual driving mode, the future gear and the time of the actual gear shift command can be determined by analyzing the behavior of the driver as a function of the current driving situation. The use of sensors or navigation systems also permits the future gear to be determined and also the plausibility of the data from the driver's analysis to be tested.

Examples of the application of the method according to the invention for various types of transmissions are described below with reference to FIG. 6. The time profile of the preselection instruction gp_pct1_cmd that prepares the gear shift from a gear n to the next gear n+1, and of the gear shift instruction gp_nxt_cmd that triggers the gear shift is illustrated in the upper part of the diagram.

In the case of double clutch transmissions, such as those disclosed in the ATZ Automobiltechnische Zeitschrift 101 (1999) 5, pages 350–357, it is appropriate to leave the idling or neutral position engaged on the second transmission shaft for as long as possible to keep the losses in the transmission low. The preparation of the second transmission shaft for the gear shift can be kept as short as possible by the prediction of the new gear.

The preparation is expediently started such a short time before the actual gear shift that when the shift-up or shift-down characteristic curve is reached the gear on the second transmission shaft (shaft 2 in the lower part of FIG. 6) is just engaged. For this, the extrapolation of the current working point is displaced so far into the future that there is still sufficient time to prepare the second shaft for the new gear. This begins at the time $t_1$.

The gear preselection must be made a time period $\Delta t$ before the actual gear decision by the gear shift characteristic curves. The time period $\Delta t$ is composed of a synchronization time $ST = t_2 - t_1$ for the gear shift and an overlapping time $UT = t_3 - t_2$. It also depends on the dynamics of the working point.

Δ=f (gear shift time, overlapping time, dynamics of the working point)

In planetary gear transmissions, the initial phase of a gear shift operation includes reducing the pressure at the opening clutch or brake without slip occurring and increasing the pressure at the clutch or brake that is to be closed such that the contact point is almost reached. The latter is usually achieved by a rapid filling operation.

In planetary gear transmissions, the duration of this initial phase is, however, of such a length that a significant delay between the manual triggering of a gear shift operation and the change in the transmission ratio that can be perceived by the driver occurs. If the method according to the invention is used in a planetary gear transmission and the initial phase of the gear shift operation described above is carried out before the actual gear shift command, the gear shift time and, in particular, the delay after the manual gear shift command can be significantly reduced. The behavior of the vehicle is significantly more sporty.

In automated manual gear shift transmissions, the predetermination of a new gear can be used to reduce the contact force between the clutch plates just before the actual gear shift operation such that slip is just avoided, that is to say, the clutch capacity is adapted to the torque to be transmitted. As a result of such a measure, it is possible to further reduce the gear shift times even in vehicles that have a sporty configuration and decidedly short gear shift times.

In contrast to the above, the conventional procedure is to adapt the clutch capacity to the torque to be transmitted at all times, as a function of the configuration of the clutch and associated with an increased expenditure of energy. In customary embodiments of the clutch for automated manual gear shift transmissions, it is necessary, in fact, to apply energy to open the clutch.

Figure 8:
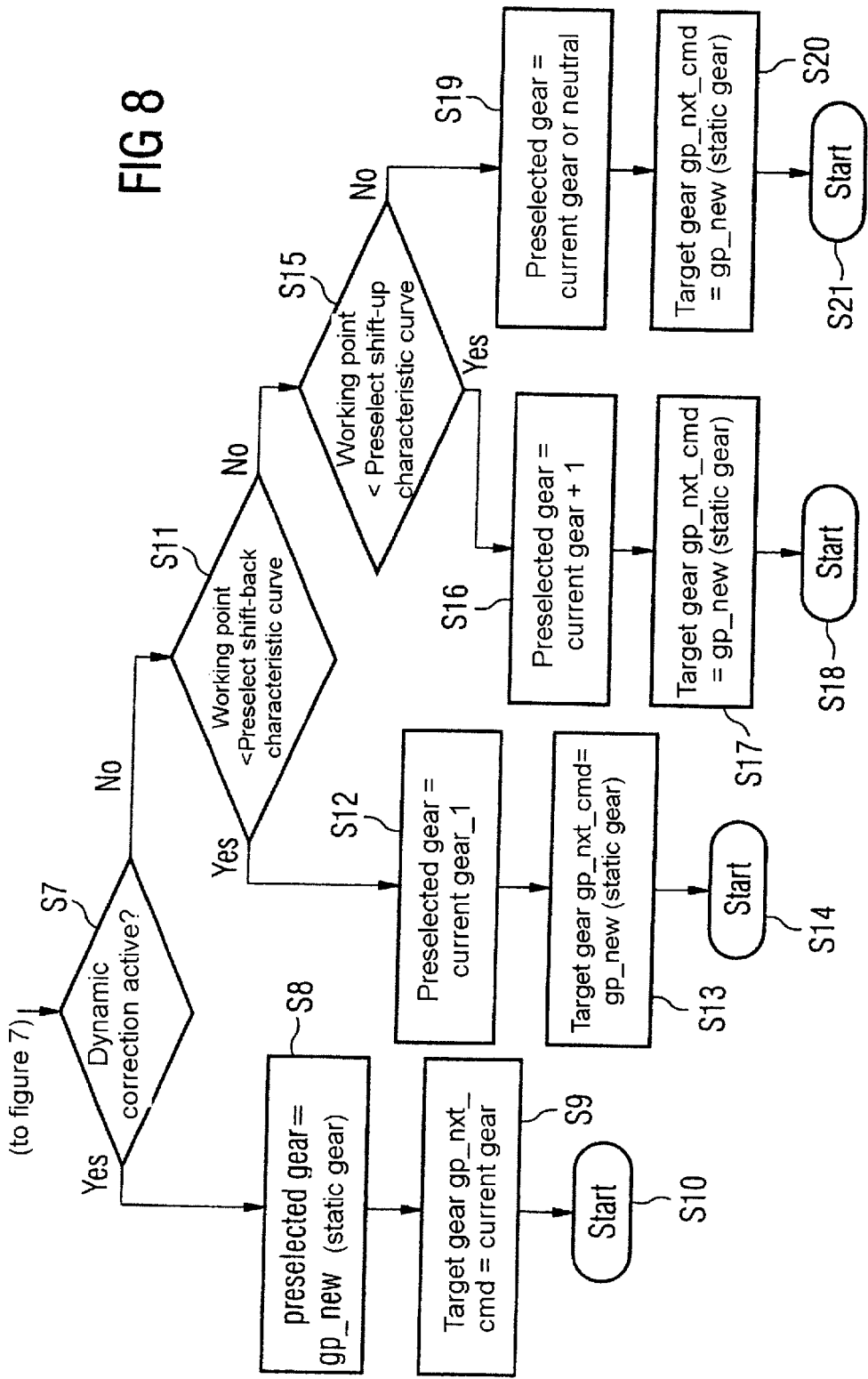

A program that can be seen in FIGS. 7 and 8 and that is executed in the method according to the invention includes the following steps (each designated by S).

S1: A load factor ld_f and a sportiness factor dr_f of the motor vehicle are calculated in the transmission controller (of the SAT type).
S2: The new static gear gp new is calculated.
S3: A gear decision that is input manually by the driver can be taken into account here.
S4: The preselection distance for a shift-down operation is calculated.
S5: The preselection distance for a shift-up operation is calculated.
S6: A dynamic correction is calculated.
S7: There is an inquiry to determine whether or not the dynamic correction is active and the program proceeds to step if S8 if the answer is yes and to step S11 if the answer is no.
S8: The preselected gear is set to be equal to the new (static) gear gp_new.
S9: The target gear gp_nxt_cmd is set to be equal to the current gear.
S10: The gear shift is started.
S11: There is an inquiry to determine whether or not the working point has dropped below the shift-down characteristic curve and the program proceeds to step if S12 if the answer is yes and to step S15 if the answer is no.
S12: The preselected gear is set to be equal to the current gear minus 1.
S13: The target gear gp_nxt_cmd is set to be equal to the new (static) gear gp_new.
S14: The gear shift is started.
S15: There is an inquiry to determine whether or not the working point has exceeded the shift-up characteristic curve and the program proceeds to step if S16 if the answer is yes and to step S19 if the answer is no.
S16: The preselected gear is set to be equal to the current gear plus 1.
S17: The target gear gp_nxt_cmd is set to be equal to the new (static) gear gp_new.
S18: The gear shift is started.
S19: The preselected gear is set to be equal to the current gear or the idling speed.
S20: The target gear gp_nxt_cmd is set to be equal to the new (static) gear gp_new.
S21: The gear shift is started.

After the steps S10, S14, S18, or S21, a gear shift is terminated in each case. The program will run through again for a subsequent gear shift.

We claim:

1. A method for controlling an automatic transmission in a drive train of a motor vehicle having a transmission controller selecting and shifting gears of the transmission, which comprises:

determining a new gear during a gear selection by referring to a gear shift characteristic curve stored in a characteristic diagram;

generating a gear shift instruction to trigger a gear shift as soon as a working point of the drive train exceeds a corresponding point on the gear shift characteristic curve;

determining, with the transmission controller, a new gear expected to be engaged shortly and carrying out an initial phase of the gear shift when the new gear differs from the currently engaged gear and as soon as the working point exceeds a pre-defined distance from the gear shift characteristic curve; and completing a gear shift as soon as the gear shift instruction has been generated.

2. The method according to claim 1, which further comprises storing preselection characteristic curves running at the pre-defined distance from the individual gear shift characteristic curves in the characteristic diagram.

3. The method according to claim 2, which further comprises calculating a distance between the preselection characteristic curves and the gear shift characteristic curves as a function of a transmission type.

4. The method according to claim 2, which further comprises calculating a distance between the preselection characteristic curves and the gear shift characteristic curves as a function of a transmission type during ongoing operation.

5. The method according to claim 1, which further comprises prohibiting a gear shift to a gear determined as being expected to be engaged shortly if a dynamic correction of the gear shift instruction has taken place.

6. The method according to claim 5, which further comprises carrying out the prohibited gear shift as soon as the dynamic correction of the gear shift instruction is eliminated.

7. The method according to claim 5, which further comprises setting the suppressed new gear as being the new gear to be engaged shortly.

8. The method according to claim 5, which further comprises setting the suppressed new gear as being the new gear expected to be engaged shortly.

9. The method according to claim 1, which further comprises predicting an expected gear shift instruction by analyzing, in a manual driving mode, a behavior of a driver of the motor vehicle characteristic of a driving style.

10. A method for controlling an automatic transmission in a drive train of a motor vehicle having a transmission controller selecting and shifting gears of the transmission, which comprises:

determining a new gear during a gear selection by referring to a gear shift characteristic curve stored in a characteristic diagram;

generating a gear shift instruction to trigger a gear shift as soon as a working point of the drive train exceeds a corresponding point on the gear shift characteristic curve;

determining, with the transmission controller, a new gear expected to be engaged shortly and carrying out an initial phase of the gear shift as soon as the working point exceeds a pre-defined distance from the gear shift characteristic curve; and completing a gear shift as soon as the gear shift instruction has been generated.

11. In an automatic transmission of a motor vehicle, the transmission having gears, a transmission controller for controlling a transmission ratio, comprising:

a characteristic diagram memory storing:
      transmission ratios to be set as a function of:
         a torque; and
         a variable functionally associated with a speed of the vehicle;
      gear shift characteristic curves; and
      preselection characteristic curves lying at a predetermined distance from said gear shift characteristic curves; and a processor programmed:
      to signal an expected new gear to the transmission and to prepare a gear shifting operation when a working point overshoots said preselection characteristic curves; and
      to trigger a gear shifting operation when the working point of the motor vehicle overshoots the gear shift characteristic curves.

12. The controller according to claim 11, including:

a gear selector circuit for determining a new gear of the transmission, said gear selector circuit connected to said processor; and a transmission control unit connected to said processor and to said gear selector circuit, said transmission control unit receiving a new gear signal, preparing a gear shifting operation, and carrying out a gear shift to the new gear as soon as the new gear determined by said gear selector circuit differs from a currently engaged gear.

* * * * *